(12) United States Patent
Chen et al.

(10) Patent No.: US 8,543,736 B2
(45) Date of Patent: Sep. 24, 2013

(54) DATA PROCESSING CIRCUIT

(75) Inventors: Chien-Chou Chen, Chang Hua (TW); Ming-Sung Huang, Hsin Chu County (TW); Wen Min Lu, Hsin Chu (TW)

(73) Assignee: Etron Technology, Inc., Hsin Chu (TW)

( * ) Notice: Subject to any disclaimer, the term of this patent is extended or adjusted under 35 U.S.C. 154(b) by 464 days.

(21) Appl. No.: 12/877,442

(22) Filed: Sep. 8, 2010

(65) Prior Publication Data

US 2011/0093685 A1 Apr. 21, 2011

(30) Foreign Application Priority Data

Oct. 21, 2009 (TW) .............................. 98135525 A

(51) Int. Cl.
- G06F 3/00 (2006.01)
- G06F 13/12 (2006.01)
- G06F 13/38 (2006.01)
- G06F 15/00 (2006.01)
- G06F 9/30 (2006.01)
- G06F 9/40 (2006.01)
- H03M 7/40 (2006.01)
- H03M 7/00 (2006.01)

(52) U.S. Cl.
USPC ................. 710/5; 710/68; 712/208; 712/210; 712/212; 712/300; 341/67; 341/95

(58) Field of Classification Search
USPC ............... 710/5, 68; 712/208, 210, 212, 300; 341/67, 95
See application file for complete search history.

(56) References Cited

U.S. PATENT DOCUMENTS

| | | | | |
|---|---|---|---|---|
| 4,520,456 A | * | 5/1985 | Miranker et al. | 712/300 |
| 4,567,572 A | * | 1/1986 | Morris et al. | 712/300 |
| 5,079,736 A | * | 1/1992 | Kitsuregawa et al. | 1/1 |
| 5,084,815 A | * | 1/1992 | Mazzario | 1/1 |
| 5,303,381 A | * | 4/1994 | Yagasaki | 1/1 |
| 5,440,736 A | * | 8/1995 | Lawson, Jr. | 1/1 |
| 5,511,189 A | * | 4/1996 | Machida | 712/300 |
| 5,557,271 A | * | 9/1996 | Rim et al. | 341/67 |
| 5,855,016 A | * | 12/1998 | Edem et al. | 1/1 |
| 7,707,216 B2 | * | 4/2010 | Rizzo et al. | 707/752 |

FOREIGN PATENT DOCUMENTS

| | | |
|---|---|---|
| CN | 1124889 | 6/1996 |
| EP | 0 244 958 A2 * | 7/1987 |

* cited by examiner

*Primary Examiner* — Henry Tsai
*Assistant Examiner* — Eric Oberly
(74) *Attorney, Agent, or Firm* — Muncy, Geissler, Olds & Lowe, PLLC

(57) ABSTRACT

A data processing circuit is disclosed in the present invention. The data processing circuit includes a decoder and a number of N-stage circuits. The circuits receive input data from at least a memory and separate the input data into N stages. The circuit process and store the N input data simultaneously to decrease the time of data processing in the data processing circuit.

13 Claims, 6 Drawing Sheets

DATA PROCESSING CIRCUIT

BACKGROUND OF THE INVENTION (a) Field of the Invention

The invention relates to a data processing circuit, particularly to a data processing circuit for a memory.

(b) Description of the Related Art

FIG. 1 shows a schematic diagram of a common data processing circuit 10. The data sorting unit 101 of the data processing circuit 10 receives the data transmitted by a memory, 32-bit data, as shown in the figure. The decoder 102 is used to decode the data and output 24-bit data. A 24-bit data comprises six 4-bit data and each 4-bit data is processed by the data sorting unit 101 and then transmitted through the data transmission path.

It should be noted that the data sorting unit 101 comprises a plurality of data transmission paths and each path can output data with 1~10 bits. As the data sorting unit 101 outputs a 4-bit data through one data output path, the decoder 102 receives and decides which of the 1~10 bits are the effective bits and which are ineffective bits so as to transmit the effective bit length L back to the data sorting unit 101. At the same time, the decoder 102 decodes a 4-bit data. By following this method, six 4-bit data should be processed because the data processing circuit 10 has to decode a 24-bit data and thus the whole process should be repeated six times.

However, when the system is requested to process six 4-bit data within one clock, the data processing circuit according to the prior art can only achieve such request by increasing the processing frequency or memory capacity. But, it causes the problems of increasing the power consumption of the system, raising the temperature of the system, and increasing the cost of the system.

BRIEF SUMMARY OF THE INVENTION

In light of the above-mentioned problems, one object of the invention is to provide a data processing circuit to increase data sorting and/or data decoding speed.

One embodiment of the invention provides a data processing circuit, comprising a decoder and a number of N-stage circuits where N is a positive integer and less than infinity. The decoder decodes data. The N-stage circuits receive input data from at least a memory and separate the input data into N stages to process and store the N input data simultaneously to decrease the time of data processing. The N-stage circuits thereby output the output data generated after processed to the decoder.

Another embodiment of the invention provides a data processing circuit, comprising a decoder and at least three-stage circuits. The decoder decodes data. The circuits receive input data from at least a memory to output the generated output data to the decoder. The input data comprise a first set of data, a second set of data, and a third set of data. The first-stage circuit sorts the input data according to the values of the input data and outputs the data with the same value to the decoder according to their order. The first-stage circuit outputs the first set of data having the first priority to the decoder and then the decoder generates a first data length according to the first set of data. The first-stage circuit outputs the second set of data having the second priority to the decoder according to the first data length and then the decoder generates a second data length according to the second set of data. The first-stage circuit outputs the third set of data having the third priority to the decoder according to the second data length and then the decoder generates a third data length according to the third set of data. The decoder calculated the sum of the first data length, the second data length, and the third data length to generate a total effective bit length.

The second-stage circuit supplies data having a length equal to the total length according to the total effective bit length. The third-stage circuit supplies data having a length equal to the total effective bit length to the second-stage circuit and determines whether or not to receive data having a length equal to the total length from the memory according to the total length.

Another embodiment of the invention provides a data processing circuit, for receiving and decoding data from a memory. The data processing circuit comprises a first data processing unit and a second data processing unit. The first data processing unit receives data from the lowest address and sorts and decodes the data received sequentially from the lowest address to the highest address to generate first decoded data. The second data processing unit receives data from the highest address and sorts and decodes the data received sequentially from the highest address to the lowest address to generate second decoded data. The first data processing unit and the second data processing unit operate simultaneously.

The data processing circuit of the embodiments of the invention separates data into a plurality of stages to process simultaneously and uses a plurality of multiplexers in the circuits to sort data for scattering the path delay time in the prior art so that the input data can be replenished in time to reduce data processing path length. Thus, decoding data within one clock can be achieved and the data processing speed can be increased so as to solve the problems in the prior art.

DETAILED DESCRIPTION OF THE INVENTION

The data processing circuit according to the invention are described in details with reference to the drawings.

Figure 1:
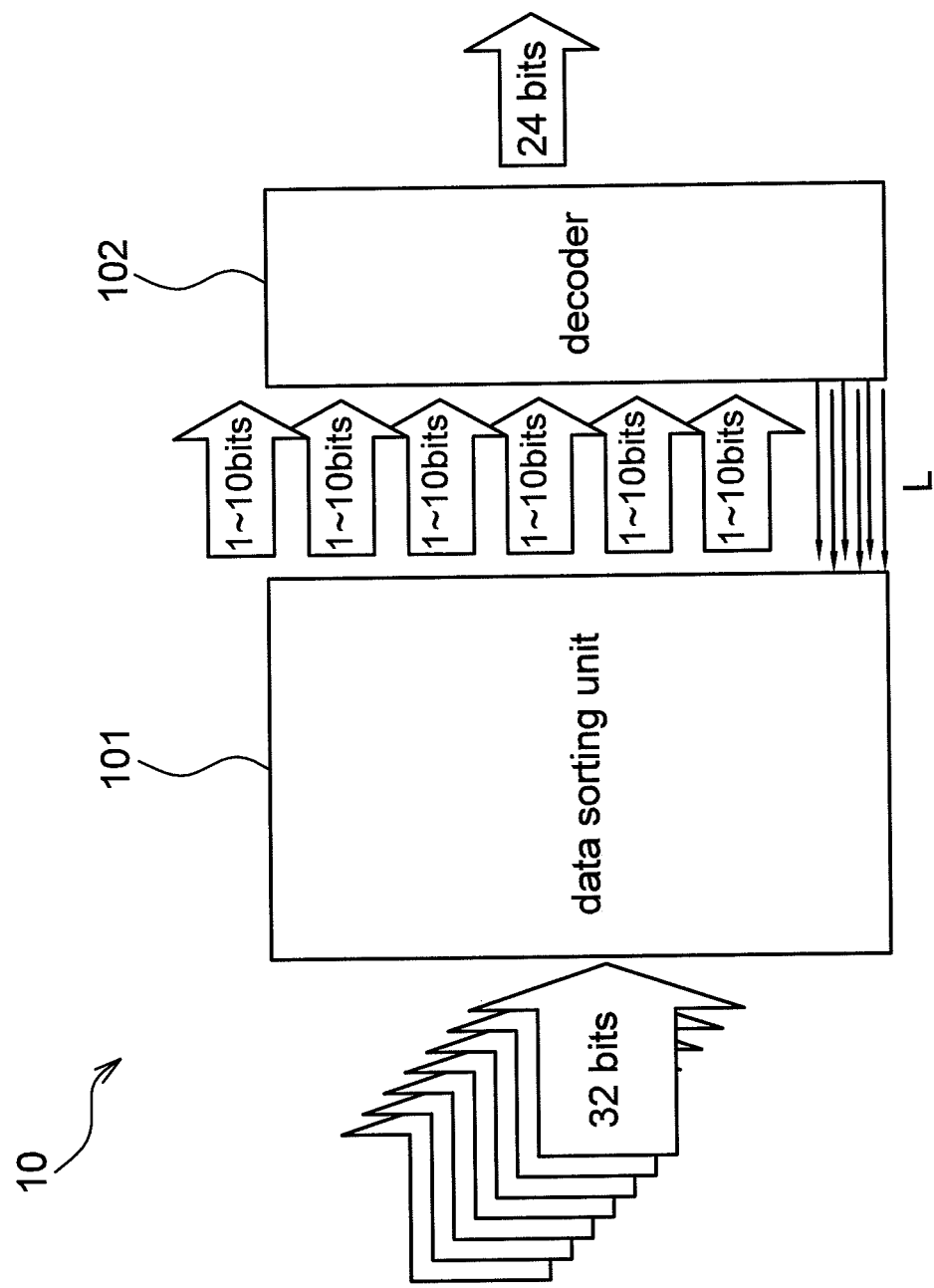
FIG. 1 shows a schematic diagram illustrating a data processing circuit according to the prior art.
Figure 2A:
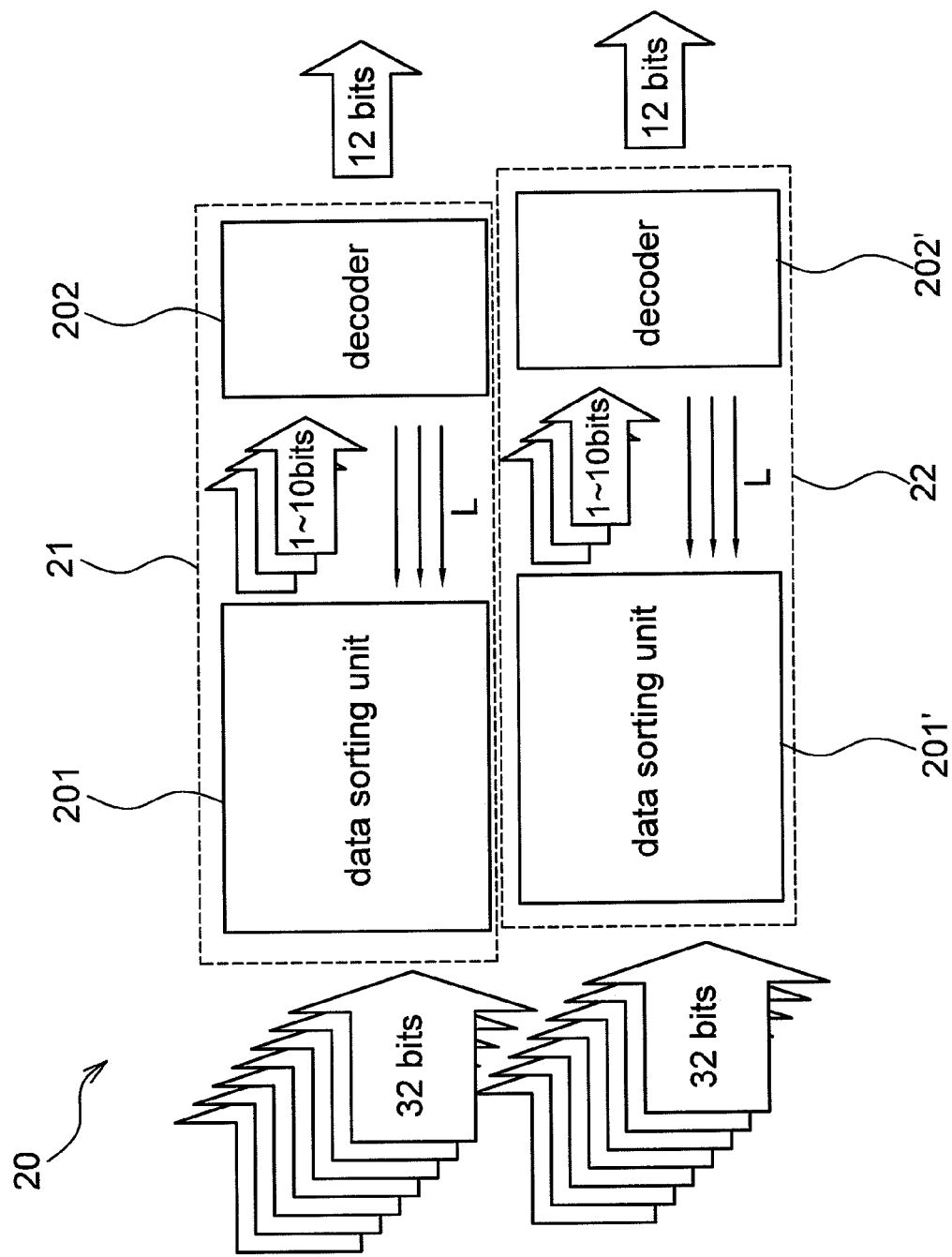
FIG. 2A shows a schematic diagram illustrating a data processing circuit according to one embodiment of the invention.

FIG. 2A shows a schematic diagram illustrating a data processing circuit according to one embodiment of the invention. The data processing circuit 20 comprises two data processing units 21 and 22. The data processing unit 21 comprises a data sorting unit 201 and a decoder 202. The structure of the data processing unit 22 is the same as that of the data processing unit 21 and will not be further described.

As the data processing circuit 20 receives 32-bit input data, the input data are divided into two paths to be processed by the two data processing units 21 and 22 so that each of the six 24-bit data processed by the prior technology are now divided into two sets of three 4-bit data. In one embodiment, the data processing circuit 20 separates the input data to two paths to receive. One path is to receive from the lowest address to the highest address where the data sorting unit 201 of the data processing unit 21 sequentially receives and sorts the data; and the decoder 202 sequentially decodes the data from the lowest address to the highest address while the other path is to receive from the highest address to the lowest address where the data sorting unit 201' of the data processing unit 22 sequentially receives and sorts the data; and the decoder 202' sequentially decodes the data from the lowest address to the highest address. By following this method, the input data are separated into two groups to be sorted and decoded simultaneously by the data sorting units 201, 201' and the decoders 202, 202'.

It should be noted that the processing speeds of the two paths are not necessarily the same. As the data are separated to be received through two paths and the processing speeds of the two paths are not the same, the final data quantity to link the two paths may be different. The data processing circuit 20 according to the embodiment of the invention will add the final remained data of the two paths together to fill in one address so that the problem can be solved.

Figure 2B:
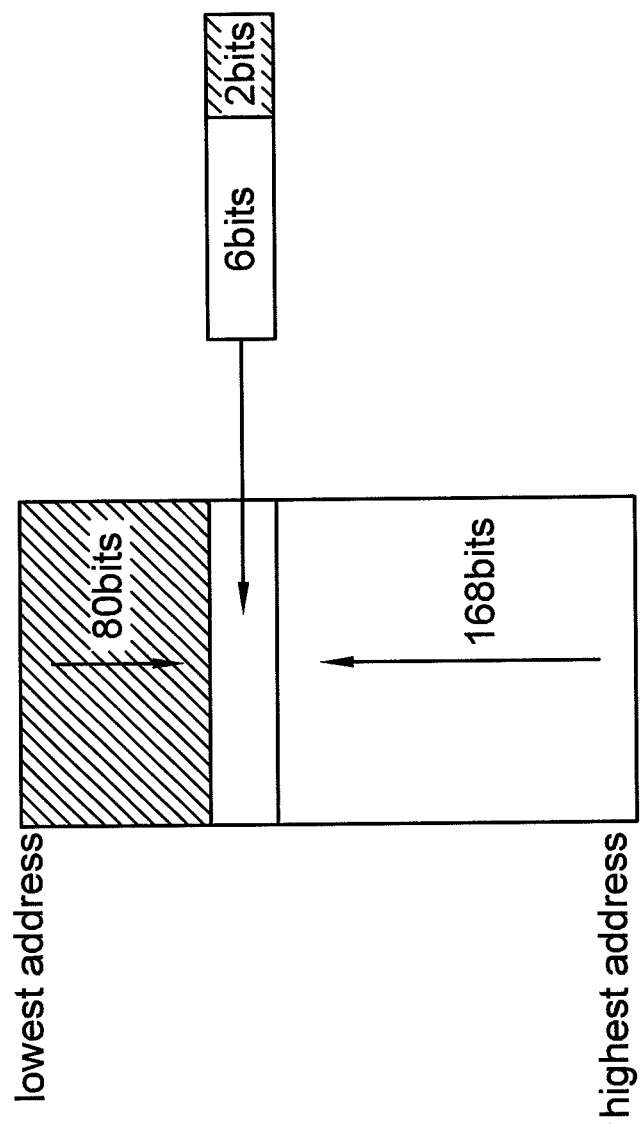
FIG. 2B shows a schematic diagram illustrating the operating method of the data processing circuit shown in FIG. 2A.

The processing method to link the data is shown in FIG. 2B. It is assumed that the data processing circuit 20 has 256 bits of storage space and each address can be filled with 8 bits of data. As the processing speed from the lowest address to the highest address is slower, only 82 bits are received. On the other hand, the processing speed from the highest address to the lowest address is faster, 168 bits are received. Since each address has 8 bits, the remained 6 bits of data of one path and the remained 2 bits of data of the other path are added up to fill in one address. Thus, the data can be appropriately processed through separating into two groups.

According to the above method, the data processing circuit 20 according to the embodiment of the invention needs only process three times in one path. That is, one decoder needs decode 4*3=12 bits of data. Besides, two paths are used to process data simultaneously to increase the data processing speed.

Figure 3:
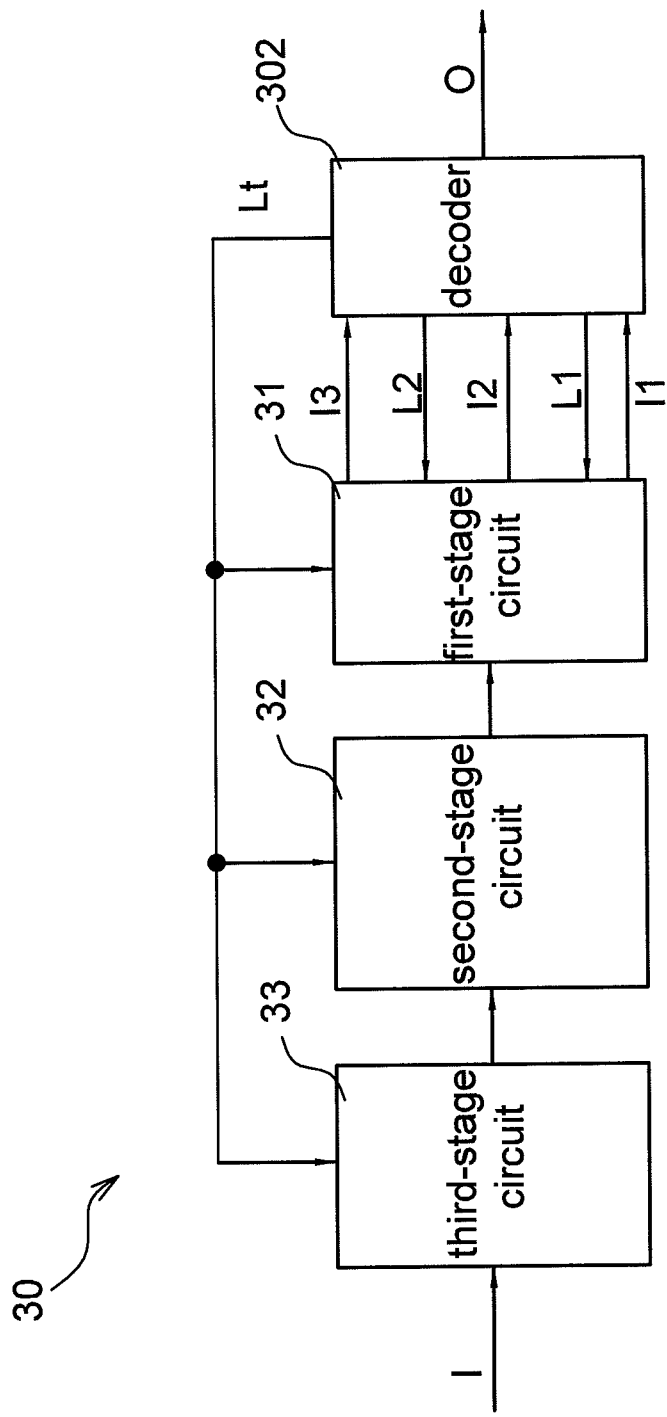
FIG. 3 shows a schematic diagram illustrating a data processing circuit according to another embodiment of the invention.

FIG. 3 shows a schematic diagram illustrating a data processing circuit 30 according to another embodiment of the invention. The data processing circuit 30 comprises a decoder 302 and a number of N-stage circuits where N is larger than or equal to 3 and less than infinity. The decoder 302 is used to decode the data transmitted by the N-stage circuits. The N-stage circuits are used to process a plurality of data I from at least one memory. For example, the N-stage circuits separate the input data into N stages to sort and/or store the N input data simultaneously to thereby output the output data generated after processed to the decoder 302.

In one embodiment, as shown in FIG. 3, the data processing circuit 30 comprises three circuits, that is, one first-stage circuit 31, one second-stage circuit 32, and one third-stage circuit 33.

The first-stage circuit 31 sorts the data according to the values of the data I and sequentially outputs the data with the same value to the decoder 302. The first-stage circuit 31 outputs the first set of data I1 having the first priority to the decoder 302 and then the decoder 302 generates a first data length L1 according to the first set of data I1. The first-stage circuit 31 outputs the second set of data I2 having the second priority to the decoder 302 according to the first data length L1 and then the decoder 302 generates a second data length L2 according to the second set of data I2. The first-stage circuit 31 outputs the third set of data I3 having the third priority to the decoder 302 according to the second data length L2 and then the decoder 302 generates a third data length L3 according to the third set of data I3. The decoder 302 calculates the sum of the first data length L1, the second data length L2, and the third data length L3 to generate a total effective bit length Lt.

The second-stage circuit 32 replenishes data having a length equal to the total length Lt from the third-stage circuit 33 according to the total effective bit length Lt.

The third-stage circuit 33 supplies data having a length equal to the total length Lt to the second-stage circuit and determines whether the stored data is sufficient or not. The third-stage circuit 33 determines whether or not to receive data having a length equal to the total length Lt from the memory according to the total length Lt.

It should be noted that the N-stage circuits sort data according to the order and values of the input data I. The last stage circuit of the N-stage circuits, for example the third-stage circuit, determines whether or not to receive data having a length equal to the total length Lt from the memory according to the total length Lt and/or a related parameter. The related parameter is obtained according to the total effective bit length Lt and the control state of the N-stage circuits.

The data processing circuit 30 according to the embodiment of the invention separates the data into N stages for processing and sorts the input data I to thereby store temporarily in a plurality of circuits for scattering the path delay time in the prior art so that the input data I can be replenished to the data processing circuit in time. Thus, the decoder 302 can complete the decoding operation to generate the decoded data O. By this method, the data processing circuit 30 according to the embodiment of the invention can speed up the data processing speed to solve the problems in the prior art.

Figure 4A:
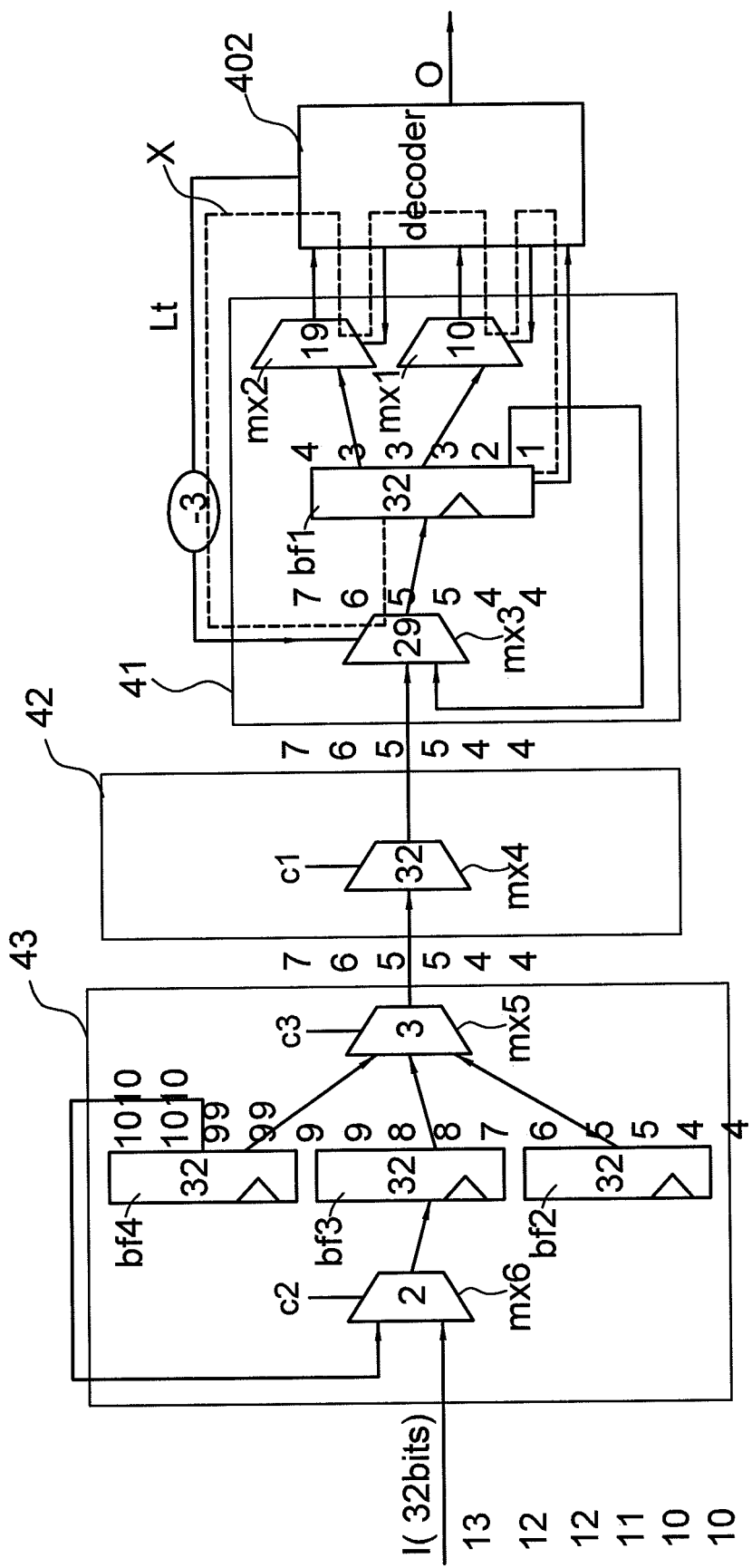
FIG. 4A shows a schematic diagram illustrating a data processing circuit according to another embodiment of the invention.

FIG. 4A shows a schematic diagram illustrating a data processing circuit 40 according to another embodiment of the invention. The data processing circuit 40 comprises a decoder 402, a first-stage circuit 41, a second-stage circuit 42, and a third-stage circuit 43. The decoder 402 is used to decode the data transmitted by the first-stage circuit 41, the second-stage circuit 42, and the third-stage circuit 43. The first-stage circuit 41 comprises a first multiplexer mx1, a second multiplexer mx2, a first buffer bf1, and a third multiplexer mx3. The second-stage circuit 42 comprises a fourth multiplexer mx4. The third-stage circuit 43 comprises a fifth multiplexer mx5, a second buffer bf2, a third buffer bf3, a fourth buffer bf4, and a sixth multiplexer mx6.

In one embodiment, the first multiplexer mx1 is a 10-to-1 multiplexer, the second multiplexer mx2 is a 19-to-1 multiplexer, the first buffer bf1 is a 32-bit first in first out (FIFO) buffer, the third multiplexer mx3 is a 29-to-1 multiplexer, the fourth multiplexer mx4 is a 32-to-1 multiplexer, the fifth multiplexer mx5 is a 3-to-1 multiplexer, the $2^{nd}$~$4^{th}$ buffers are 32-bit first in first out (FIFO) buffers, and the sixth multiplexer mx6 is a 2-to-1 multiplexer.

The operating method of the data processing circuit 40 according to the embodiment of the invention will be described in details as follows. To simplify the description, the original 32-bit input data are reduced to 6-bit data.

At first, during initialization, the data processing circuit 40 receives the input data I and writes the input data I sequentially into the third-stage circuit 43, the second-stage circuit 42, and the first-stage circuit 41.

Then, the first-stage circuit 41 sorts the input data I according to their values and the data with the same value are sorted according the order. In the first buffer bf1, the data of the first address 0 is arranged foremost and the data of the second address 1 is arranged in the following. The rest can be deduced by analogy. As shown in the figure, the data temporarily stored in the first-stage circuit 41~the third-stage circuit 43 according to the order are [1, 2, 3, 3, 3, 4], [4, 4, 5, 5, 6, 7],

[8, 8, 9, 9, 9, 9], [9, 9, 10, 10, 10, 10], [10, 10, 11, 12, 12, 13], . . . . In the first buffer bf1 of the first-stage circuit 41, the data 1 is a one-bit data and can be considered as the first data I1 to be outputted to and decoded by the decoder 402. The data 2 is also a one-bit data and can be considered as the second data I2 to be outputted to and decoded by the decoder 402. The data 3 is a 3-bit data and can be considered as the third data I3 to be outputted to and decoded by the decoder 402. In the second buffer bf1 of the third-stage circuit 43, there are four data 4 and it will consume 4-bit data to be considered as the fourth set of data. There are two data 5 and so forth.

When the data start to be inputted, the decoder 402 decodes the first set~the third set of data within one clock to consume 5 bits [1, 2, 3, 3, 3] of data. At this time, the total effective bit length Lt decoded by the decoder 402 is equal to 5 (Lt=5). It should be noted that the reason why the third multiplexer mx3 is a 29-to-1 multiplexer is because the data processing by the first buffer bf1, the first multiplexer mx1, and the second multiplexer mx2 in the front will move (process) at least 3 bits of data within one clock, the first-stage circuit 41 requires to process 32 bits of data when the data processing circuit 40 receives 32 bits of data, and thus 32-3 bits equal 29 bits so that the third multiplexer mx3 of the first-stage circuit 41 only requires to select 29 bits of data to input to the first buffer bf1.

In the third-stage circuit 43, the second buffer bf2 stores the following data [4, 4, 5, 5, 6, 7], the third buffer bf3 stores the data [8, 8, 9, 9, 9, 9], and the fourth buffer bf4 stores the data [9, 9, 10, 10, 10, 10]. Since the above processing consumes 5 bits, the fifth multiplexer mx5 selects the following 5 bits of data according to the third control signal c3. Since the fifth multiplexer mx5 is preset to select 6 data (for those who are skilled in the art, if the input data are 32 bits, 32 data should be selected once), the data are [4, 4, 5, 5, 6, 7].

It should be noted that the second control signal c2=L_pre+c2_pre+offset (omitted here)=0+0=0. Thus, c3=c2+offset (omitted here)=0. Therefore, the fifth multiplexer mx5 selects the data [4, 4, 5, 5, 6, 7] in the second buffer bf2 and outputs to the fourth multiplexer mx4. The related parameter L_pre is the previous total length Lt'. Since Lt is set to 0 during initialization, L_pre=0. The related parameter c2_pre is the previous second control signal. Since the second control signal is set to 0 during initialization, c2_pre=0. The related parameter "offset" represents any one value of the two or three selected values.

Then, the fourth multiplexer mx4 of the second-stage circuit 42 receives the data [4, 4, 5, 5, 6, 7] and sorts the data according to their values. Since the data are sorted, there is no further sorting operation. Thus, the fourth multiplexer mx4 outputs the data [4, 4, 5, 5, 6, 7] according to the first control signal c1 where c1=L_pre+c1_pre+offset and the related parameter L_pre is the previous total length Lt. Since Lt is set to 0 during initialization, L_pre=0. The related parameter c1_pre is the previous first control signal. Since the first control signal is set to 0 during initialization, c1_pre=0. The related parameter "offset" represents separately selected values from 6 bits. Obviously, if the input data are 32 bits, it is selected from 0~31 bit.

Figure 4B:
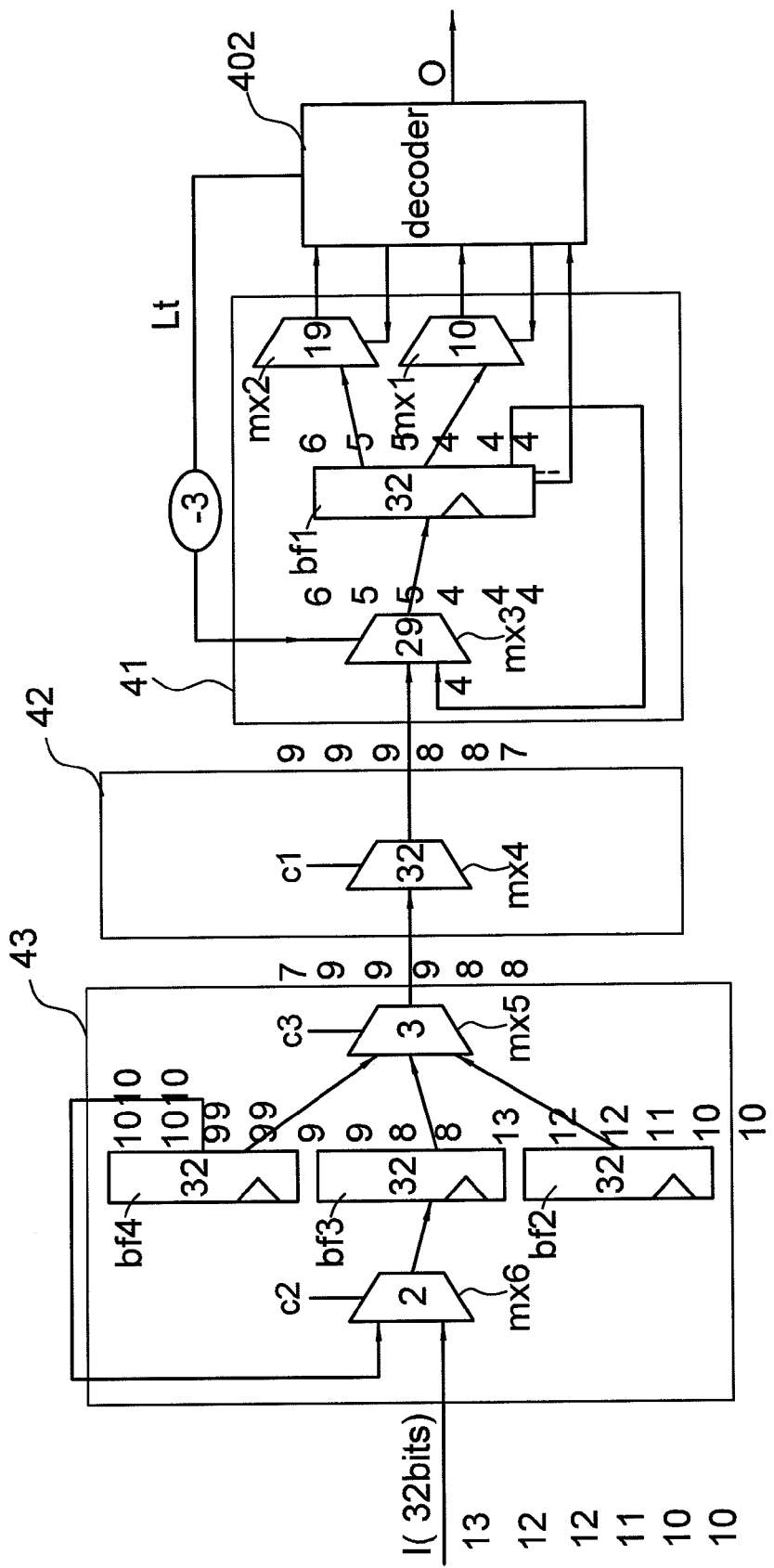
FIG. 4B shows a schematic diagram illustrating the operating method of the data processing circuit shown in FIG. 4A.

It has been mentioned previously that the first-stage circuit 41 consumes 5 bits and the remained 1-bit data 4 is transmitted by the first buffer bf1 to the third multiplexer mx3. It is arranged together with the data [4, 4, 5, 5, 6] to form the 6-bit data [4, 4, 4, 5, 5, 6] as shown in FIG. 4B to be outputted to the first buffer bf1. It should be noted that the unused data [7] is still stored in the second buffer bf2. Then, the first-stage circuit 41 outputs three sets of data [4, 4, 4], [5, 5], and [6] sequentially to the decoder 402 for decoding within one clock. At the same time, the fifth multiplexer mx5 receives the data [7] of the second buffer bf2 and the data [8, 8, 9, 9, 9] of the third buffer bf3 to generate data [8, 8, 9, 9, 9, 7]. After that, the fourth multiplexer mx4 sorts the data to generate the sorted data [7, 8, 8, 9, 9, 9]. At the same time, the sixth multiplexer mx6 receives the following input data I [10, 10, 11, 12, 12, 13] according to the second control signal c2 to temporarily store in the second buffer bf2. Till now, those who are skilled in the art should understand the operating method of the data processing circuit. Thus, the repeat operation will not be described hereinafter.

By following the above operating method, the data processing circuit 40 according to the embodiment of the invention can prepare next set of data in time to the decoder 402 for decoding. When the data are insufficient, the third-stage circuit 43 will receive the subsequent data through the sixth multiplexer mx6. A plurality of multiplexers are used to sort data in the circuits to scatter the path delay time of the circuit in the prior art so that the input data can be replenished in time. The decoder 402 can complete the decoding operation in time to generate decoded data O. Thus, the number to be selected by the multiplexers of the first-stage circuit 41 is decreased to shorten the path length of data processing, as shown in the dotted line X of FIG. 4A. Therefore, data decoding can be completed in one clock and the data processing speed is increased. Thus, the problems in the prior art can be solved.

It should be noted that the above description is just for illustration. The data processing circuit according to the embodiments of the invention can be applied to process any current or future data having any other bit size, such as 32, 64, 128, 256, 512, . . . bits.

Although the present invention has been fully described by the above embodiments, the embodiments should not constitute the limitation of the scope of the invention. Various modifications or changes can be made by those who are skilled in the art without deviating from the spirit of the invention.

What is claimed is:

1. A data processing circuit, comprising:
a decoder, for decoding data; and
at least three-stage circuits for receiving input data from at least a memory to output the generated output data to the decoder wherein the input data comprise a first set of data, a second set of data, and a third set of data; and the at least three-stage circuits comprise:
a first-stage circuit, for sorting the input data according to the values of the input data and outputting the data with the same value to the decoder according to their order wherein the first-stage circuit outputs the first set of data having the first priority to the decoder and then the decoder generates a first data length according to the first set of data; the first-stage circuit outputs the second set of data having the second priority to the decoder according to the first data length and then the decoder generates a second data length according to the second set of data; the first-stage circuit outputs the third set of data having the third priority to the decoder according to the second data length and then the decoder generates a third data length according to the third set of data; and the decoder calculates the sum of the first data length, the second data length, and the third data length to generate a total effective bit length;
a second-stage circuit, for replenishing data having a bit length equal to the total effective bit length from a third-stage circuit to the first-stage circuit according to the total effective bit length; and the third-stage circuit, for supplying data to the second-stage circuit to replenish data to reach a bit length equal to the total effective bit length and determining whether the third-stage circuit stores enough data to supply to the second-stage circuit according to the total effective bit length and determining whether the third-stage circuit receives data from the memory.

2. The circuit according to claim 1, wherein the three-stage circuits are used to sort, temporarily store, or convert the input data.

3. The circuit according to claim 1, wherein the first-stage circuit comprises:
a third multiplexer, thr receiving and sorting the input data;
a first buffer, for receiving and temporarily storing the input data and outputting the first set of data to the decoder;
a first multiplexer, for receiving the second set of data according to the first data length and outputting the second set of data to the decoder; and
a second multiplexer, for receiving the third set of data according to the second data length and outputting the third set of data to the decoder;
wherein the third multiplexer further receives the data transmitted from the second-stage circuit according to the total effective bit length.

4. The circuit according to claim 3, wherein the first multiplexer is a 10-to-1 multiplexer, the second multiplexer is a 19-to-1 multiplexer, the third multiplexer is a 29-to-1 multiplexer, and the first buffer is a 32-bit first in first out (FIFO) buffer.

5. The circuit according to claim 3, wherein the first buffer further transmits the remained data after the previous processing on the three sets of data to the third multiplexer so that the remained data are sorted together with the input data to be processed next time and outputted to the first buffer.

6. The circuit according to claim 3, wherein the second-stage circuit comprises a fourth multiplexer for receiving the data transmitted by the third-stage circuit according to a first control signal where the first control signal is related to the total effective bit length of the previous processing and the first control signal of the previous processing.

7. The circuit according to claim 6, wherein the fourth multiplexer is a 32-to-1 multiplexer.

8. The circuit according to claim 6, wherein the third-stage circuit comprises:
a second buffer, for temporarily storing the first portion of the input data;
a third buffer, for temporarily storing the second portion of the input data wherein the second portion of the input data is placed behind the first portion of the input data;
a fourth buffer, for temporarily storing the third portion of the input data wherein the third portion of the input data is placed behind the second portion of the input data;
a sixth multiplexer, for receiving the input data and the remained data in the first buffer, the second buffer, or the third buffer after the previous processing and outputting the input data and/or the remained data after the previous processing according to a second control signal wherein the second control signal is related to the total effective bit length of the previous processing and the second control signal of the previous processing; and
a fifth multiplexer, for deciding to output any portion of the three portions of data according to a third control signal wherein the third control signal is related to the second control signal.

9. The circuit according to claim 8, wherein the second buffer, the third buffer, and the fourth buffer are 32-bit first in first out (FIFO) buffers; the fifth multiplexer is a 3-to-1 multiplexer; and the sixth multiplexer is a 2-to-1 multiplexer.

10. The circuit according to claim 1, being a 32-to-24-bit data decoding circuit.

11. A data processing circuit, for receiving and decoding data from a memory, the circuit comprising:
a first data processing unit, for receiving data from the lowest address and sorting and decoding the data received sequentially from the lowest address to the highest address to generate first decoded data; and
a second data processing unit, for receiving data from the highest address and sorting and decoding the data received sequentially from the highest address to the lowest address to generate second decoded data;
wherein the first data processing unit and the second data processing unit operate simultaneously;
wherein the first data processing unit or the second data processing unit comprises:
a decoder, for decoding data; and
at least three-stage circuits for receiving input data from at least a memory to output the generated output data to the decoder wherein the input data comprise a set of data, a second set of data, and a third set of data; and the at least three-stage circuits comprise:
a first-stage circuit, for sorting the input data according to the values of the input data and outputting the data with the same value to the decoder according to their order wherein the first-stage circuit outputs the first set of data having the first priority to the decoder and then the decoder generates a first data length according to the first set of data; the first-stage circuit outputs the second set of data having the second priority to the decoder according to the first data length and then the decoder generates a second data length according to the second set of data; the first-stage circuit outputs the third set of data having the third priority to the decoder according to the second data length and then the decoder generates a third data length according to the third set of data; and the decoder calculates the sum of the first data length, the second data length, and the third data length to generate a total effective bit length;
a second-stage circuit, for replenishing data having a bit length equal to the total effective bit length from a third-stage circuit to the first-stage circuit according to the total effective bit length; and
the third-stage circuit, for supplying data to the second-stage circuit to replenish data to reach a bit length equal to the total effective bit length and determining whether the third-stage circuit stores enough data to supply to the second-stage circuit according to the total effective bit length and determining whether the third-stage circuit receives data from the memory.

12. The circuit according to claim 11, wherein the data quantity at the junction between two data receiving paths of the first data processing unit and the second data processing unit is different when the sorting or processing speeds of the first data processing unit and the second data processing unit are different and the data processing circuit adds up the final remained data of the two paths to fill in an address.

13. The circuit according to claim 11, being a 32-to-24-bit data decoding circuit.

* * * * *